Aug. 6, 1940.   A. G. FELDMAN   2,210,071
COLLAPSIBLE BABY CARRIAGE
Filed March 27, 1939   3 Sheets-Sheet 3
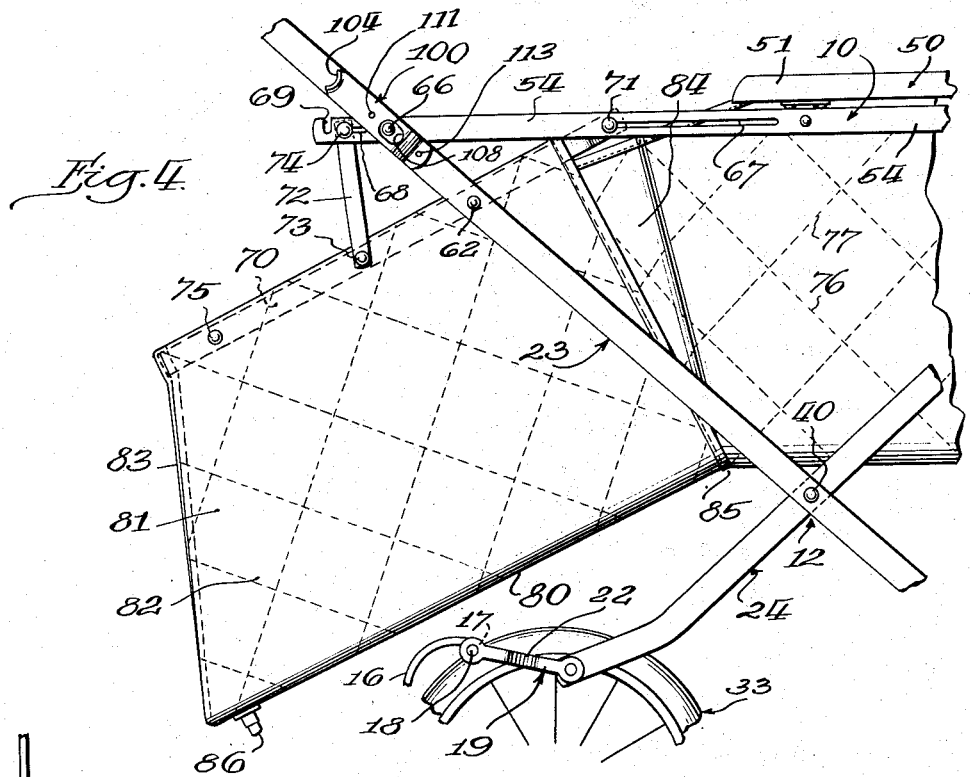
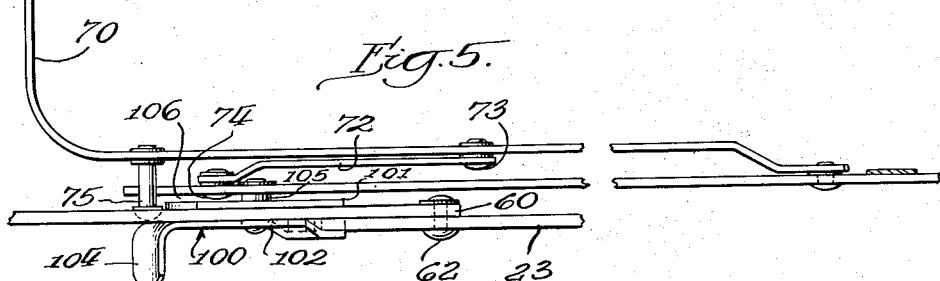
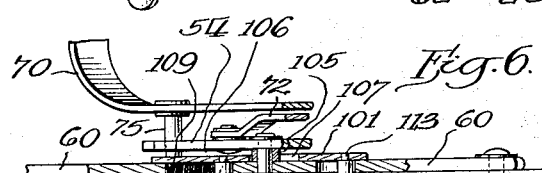
Inventor
Abraham G. Feldman

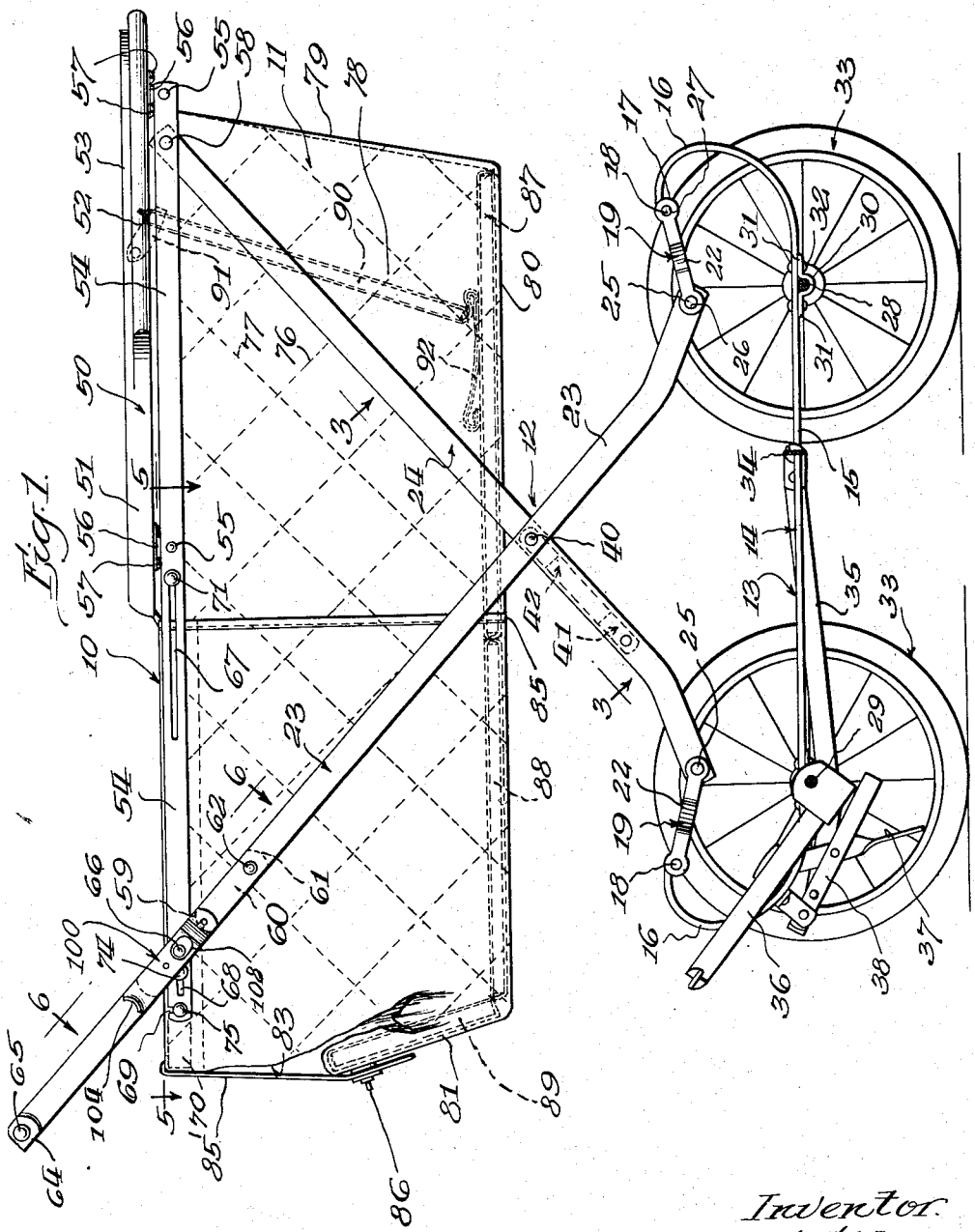

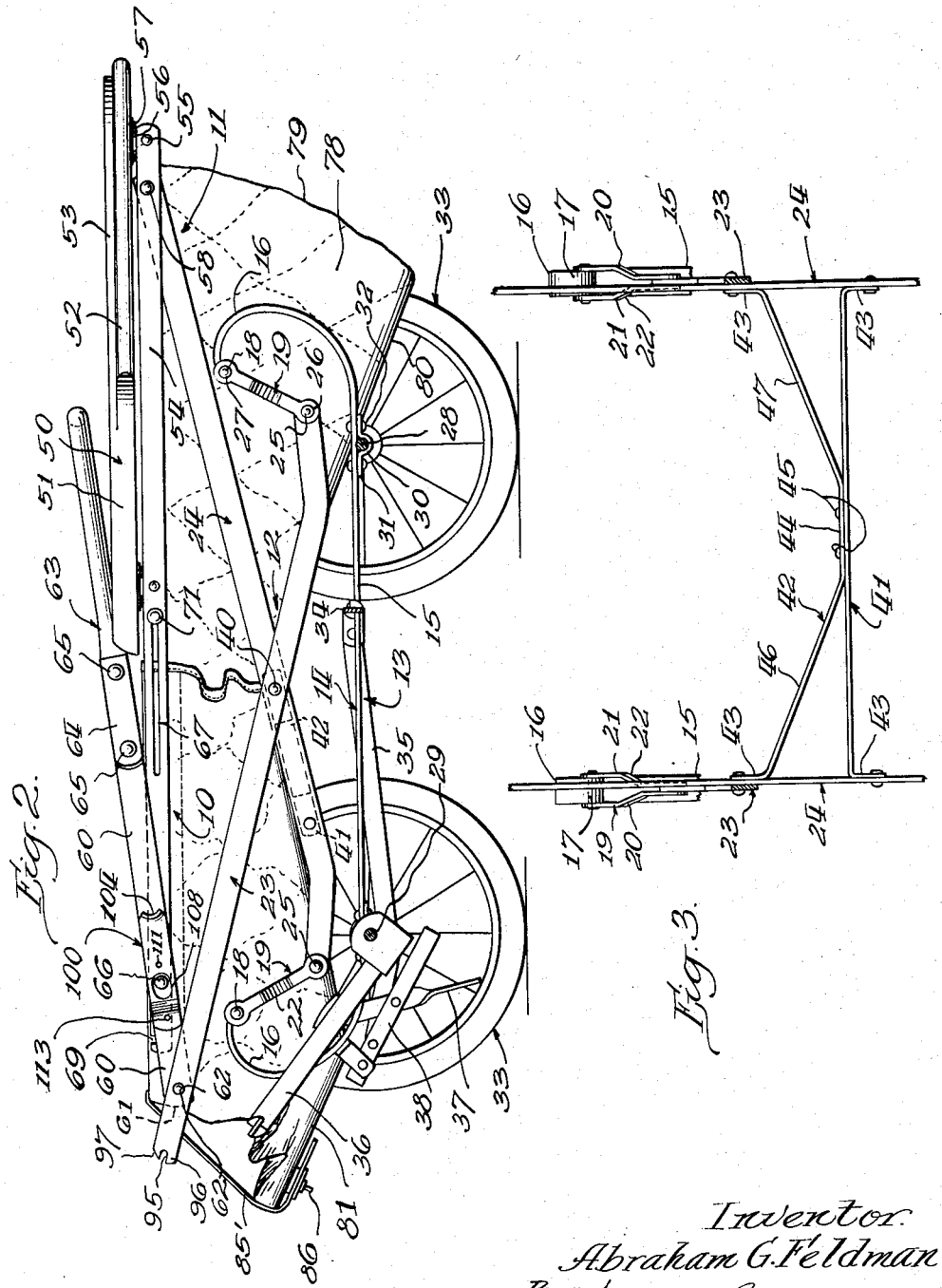

Patented Aug. 6, 1940

2,210,071

UNITED STATES PATENT OFFICE 2,210,071

COLLAPSIBLE BABY CARRIAGE

Abraham G. Feldman, Chicago, Ill., assignor to Storkline Furniture Corporation, Chicago, Ill., a corporation of Illinois Application March 27, 1939, Serial No. 264,282

2 Claims. (Cl. 280—41)

The present invention relates to collapsible baby carriages, and is particularly concerned with collapsible baby carriages of the type which are spring-supported and adapted to be folded into a minimum amount of space.

One of the objects of the invention is the provision of a collapsible baby carriage of the scissors type, which is adapted to be spring-supported upon a chassis in such manner that the scissors may be folded or opened and so that the carriage is adapted to receive full benefit of the springs upon which it is carried.

Another object of the invention is the provision of an improved form of adjustable foot well for collapsible baby carriages so that the carriage may be utilized either with the floor of the basket in horizontal condition or with a part depressed in such manner as to adapt the carriage for use as a stroller.

Another object of the invention is the provision of an improved collapsible baby carriage provided with a set of springs carried by the chassis in such manner that the springs are tensioned when the collapsible mechanism is opened and the springs tend to collapse the mechanism against the action of a locking device.

Another object of the invention is the provision of an improved basket construction adapted to provide a more comfortable conveyance and to provide a suitable extension for use in storing merchandise or to provide more foot room for the occupant.

Another object of the invention is the provision of an improved form of locking device for collapsible carriages of the type described, which holds the carriage firmly in open position, but which is simple and easy to operate for the purpose of folding the carriage.

Another object of the invention is the provision of an improved baby carriage which is sturdy, capable of economical manufacture and spring-supported in such manner that it is adapted to have comfortable riding characteristics and also adapted to fold into a minimum amount of space.

Other objects and advantages of the invention will be apparent from the following description and the accompanying drawings, in which similar characters of reference indicate similar parts throughout the several views.

Referring to the three sheets of drawings:

Fig. 1 is a side elevational view of a collapsible baby carriage constructed according to the present invention, with the carriage in open position and with the two wheels in the foreground removed to expose the mechanism;

Fig. 2 is a similar view, with the parts of the collapsible mechanism in the folded position;

Fig. 3 is a fragmentary sectional view of a part of the collapsible frame, taken on the plane of the line 3—3 of Fig. 1, looking in the direction of the arrows;

Fig. 4 is a fragmentary elevational view, similar to Fig. 1, showing only the rear end of the carriage, with the foot well in the position which it assumes when the carriage is to be used as a stroller;

Fig. 5 is a fragmentary sectional view, showing the locking mechanism for the collapsible frame, taken on the plane of the line 5—5 of Fig. 1;

Fig. 6 is a fragmentary sectional view, taken on the plane of the line 6—6 of Fig. 1, looking in the direction of the arrows.

Referring to Figs. 1 and 2, 10 indicates in its entirety the upper framework, 11 the basket supported thereby, 12 the collapsible scissors mechanism, and 13 the chassis.

The chassis preferably includes a pair of strap steel springs 14, which are identical in shape and structure and located on opposite sides of the vehicle.

The springs 14 each have the central flat portion 15 and the upwardly and inwardly curved end portions 16 at each end. The end portions 16 are each formed with the curved bearings 17 adapted to receive the pivot pins or rivets 18 by means of which the springs are pivotally secured to the shackles 19.

Each of the shackles 19 comprises a pair of straps of steel 20, 21 of identical structure, but reversed in position. Each strap 20, 21 has an offset at 22 so that the ends opposite to the pintle 18 may be brought close enough together to engage on the opposite sides of one of the scissor bars 23, 24, to which they are pivotally secured by means of a rivet 25. Each shackle bar 20, 21 has at each end an aperture 26 and 27 serving as bearings for receiving the rivets 18 or 25.

The collapsible framework includes the scissor bars 23, 24 of similar structure on both sides of the carriage and secured by means of shackles to the springs in the same manner.

The chassis 13 also includes the steel rods 28, 29, serving as axles and secured to the springs 14 by means of the U-shaped brackets 30, which have attaching flanges 31 riveted to the lower side of the springs by rivets 32.

Each axle 28, 29 is longer than the width of the collapsible framework so that it projects at each side beyond the springs 14 by an amount sufficient to provide rotatable support for a rubber-tired metal wheel.

Thus four rubber tired metal wheels 33 are rotatably mounted upon the axles 28, 29 and secured thereon by means of cotter-pins passing through the axles.

The braking mechanism, comprising the bendable brake beam 34, connecting rod 35, foot pedal 36, release pedal 37, frame 38, and other elements may be similar to that described in my prior application, Ser. No. 260,067, filed March 6, 1939, on Collapsible baby carriages, and forms no part of features to be covered by this application.

In the view of Fig. 1, the two wheels in the foreground have been removed; that is, a section is taken on a plane just inside the two wheels on the right side of the vehicle.

The collapsible mechanism of the vehicle includes two similar scissor bars 23 and two similar scissor bars 24, one of the bars 23 and 24 being pivotally secured together by means of a rivet 40 on each side of the carriage.

The scissor bars 24 are the inner ones in this arrangement and, as they are arranged on the inner side of the framework, they may be secured together by means of the cross frame members 41, 42, which consist of straps of steel provided with attaching flanges 43 at each end, which are riveted to the opposite scissor bars 24.

The transverse frame member 41 may be straight, while the transverse frame member 42 has a flat central portion 44 that is riveted by means of rivets 45 to the frame member 41. Extending from the flat central portion 44 of the transverse frame member 42 there is a diagonal bracing portion 46, 47 at each end.

Thus the scissor bars 24 at each side of the vehicle are firmly secured together so that they are kept in definite spaced relation to each other and in substantially parallel relation to each other at all times. When one scissor bar 24 becomes collapsed, the other one must follow it, and thus both sides of the vehicle must collapse at the same time.

The framework 41—47 also increases the rigidity of the collapsible mechanism when it is extended as shown in Fig. 1.

As previously stated, the lower ends of the scissor bars 23, 24 are secured by means of shackles 19 to the springs 14. The length and proportion of these various parts is such that when the collapsible mechanism is extended, as shown in Fig. 1, the shackles 19 are substantially horizontal, but slightly downwardly depressed at their inner ends, due to the weight of the vehicle and the tension placed on the springs.

The arrangement is also preferably such that when the scissors are extended as shown in Fig. 1, there is a pull placed upon the curved portions 16 of the springs and the springs are slightly tensioned; that is, the springs tend to collapse the mechanism, and that is also the effect of the weight of the upper parts of the vehicle.

The basket 11 is carried by the framework 10 at the top of the vehicle, and the framework 10 is carried by the upper ends of the scissor bars 23, 24. For this purpose the upper framework may consist of a substantially U-shaped wooden member 50, which forms a frame around the forward part of the vehicle.

The wooden frame 50 may have the ends of the legs on each side of substantially rectangular cross section, as at 51, and the remainder of the frame may be provided with an outwardly extending bead 52, forming an angular recess 53, which is adapted to receive the carriage top.

The carriage top rests upon the bead 52 when it is folded. Fixedly secured to the lower side of the wooden frame member 50 on each leg is a steel strap frame member 54, which may be secured to the wooden frame member 50 by means of rivets 55 and angle brackets 56, which are secured to the wooden frame member by means of wood screws 57.

The scissor bars 24 may then be pivotally secured to the upper frame members 54 by means of a rivet 58 near the forward end of each frame member 54. The scissor bar members 23, however, terminate short of the frame member 54 at the point 59 and each of them is pivotally secured to one of the legs 60 of the U-shaped handle, the end of each handle leg being indicated at 61, and the rivet at 62.

The handle 63 may consist of a bright tubular metal member of substantially U shape, having each of the ends of the opposite legs flattened at 64 and secured to the additional strap member 60 by means of the rivet 65.

As previously stated, the strap member 60 is pivotally secured to the scissor bar 23 at the point 62, and the handle leg 60 is pivotally secured on the frame member 54 by means of a rivet 66. The frame member 54 extends to substantially the full length of the basket 11 at the top, when the basket is in the position of Fig. 1, on each side of the basket, and each upper frame member 54 is provided with an elongated slot 67 near its central portion, a shorter slot 68 adjacent its end, and an upwardly open slot 69 at its extreme rear end, for the purpose of supporting a movable foot well framework.

A movable foot-well framework consists of a U-shaped steel strap 70 (Fig. 4), having each of the ends of its legs secured to a rivet 71, which is slidably mounted in a slot 67. The legs of the U-shaped frame member 70 are arranged inside of the upper frame members 54, and the rivets extend outwardly through the slots 67, having their heads on the outside.

At a point substantially midway between the ends of the U-shaped frame member 70, this frame member is also supported by means of a link 72 on each side, each link 72 being pivotally secured to a frame member 70 by a rivet 73, which passes through the parts of the basket and the U-shaped frame member 70.

The upper end of the link 72 is provided with a rivet 74, which is slidably mounted in the slot 68. The foot-well framework, comprising the U-shaped member 70, is supported in the position of Fig. 4 by means of the rivets 71, rivets 73, links 72, and rivets 74, but it may also be supported in the position of Fig. 1, by means of a pair of laterally extending headed studs 75.

One stud 75 is provided on each side of the U-shaped frame member 70, the stud projecting laterally to such an extent that it is adapted to be received in the slot 69 of each frame member 54, when the foot-well is lifted by means of its frame member 70 to the position of Fig. 1.

The length of the slot 67 is such that the rivet 71 can be slid forwardly in the slot 67 far enough so that the stud 75 will register with the slot 69. The slot 68 permits the sliding movement of the foot well, even when it has its upper frame member 70 in horizontal position and the link is in horizontal position.

Such sliding movement is necessary for the purpose of moving the studs 75 around the end of the frame members 54 and forward until the studs 75 engage in the slots 69.

The basket 11 preferably comprises some form of imitation leather or other manufactured fabric, which may be formed with two layers, the layers containing cotton for quilting, and the cotton being secured in place by suitable transversely extending seams 76, 77.

The padding of the quilting gives adequate protection against engagement of the fabric basket with the adjacent steel frame members, and the provision of two layers gives a finished appearance for the inside and outside of the basket alike.

The basket consists of the identical sides 78 at the front end of the vehicle, the front wall 79, and the bottom wall 80, which extends the full length of the vehicle. The side walls 78 preferably provided with an improved means for locking the collapsible framework in extended condition, which is best illustrated in Figs. 1, 2, 5, and 6. A part of this locking mechanism is comprised in the slots 95 at the end of each scissor bar 23, as shown in Fig. 2.

The slots 95 are bordered on the lower side in Fig. 2 by an elongated lug 96, but the upper lug above the slot 95 is beveled at 97 for self-locking action.

The handle legs 60 each support a sliding latching member, indicated in its entirety by the numeral 100 (Fig. 6). Each such sliding latching member comprises a flat inner strap 101 and a flat outer strap 102, the latter being provided with an offset at 103 and a laterally turned thumb piece at 104.

The rivet 66 which pivotally secures each of the handle legs 60 to the upper frame member is only necessary to pull upward on the two thumb pieces 104 at each side of the handle legs to release the latching mechanism. The tension of the springs 14 and the weight of the vehicle above the springs tends to cause the scissors 23, 24 to fold and move the handle 63 in a clockwise direction to the position shown in Fig. 2. During this movement the lower ends of the scissor bars 23, 24 spread from each other to relieve the springs of any tension and to permit the ends of these scissor bars to fold downward into the curved portions of the springs by virtue of the action of the shackles 19.

The carriage framework may be extended by merely grasping on the handle and pulling upward to move it from the position of Fig. 2 to that of Fig. 1. This is best done by using both the hands and elbows, each hand grasping the handle legs 60, and each elbow resting on the upper part of the tubular handle in such manner that the handle is rotated in a clockwise direction by means of the hands and forearms, without depending upon he fixity or movement of the rest of the vehicle; that is, when the handle is so grasped and manipulated, it does not matter whether the vehicle tends to roll forward or downward during the operation, as the hands and elbows or forearms are so employed that they positively move the handle to the position desired. When this is done, the back rest 90 should, of course, be lying flat on the bottom 80.

The spring and shackle support of the collapsible framework not only gives the upper part of the vehicle a floating action, which is present in the support of the vehicle by means of horizontal shackles, but the shackles permit a folding of the scissors down into the curved parts of the springs and permit the tensioning of the springs so that when the vehicle is in use the springs are pre-tensioned.

This prevents all rattling of parts of the collapsible framework, and improves the riding qualities of the vehicle.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a baby carriage, the combination of a supporting frame for a flexible basket, said supporting frame comprising a pair of longitudinally extending frame members, and means for joining said frame members at one end of the basket, and a U-shaped frame member for supporting the upper edge of the other end of the basket, said U-shaped frame member being slidably and pivotally mounted on said first-mentioned longitudinally extending frame members, and means carried by said U-shaped frame member for securement to the ends of said longitudinally extending frame members, whereby that end of the basket may be supported in a plurality of positions, said U-shaped frame member being also connected to the ends of said longitudinally extending frame members by a pair of links pivotally engaging said longitudinally extending frame members and said U-shaped frame member.

2. In a flexible basket for collapsible baby carriages, the combination of an upper framework for supporting said basket, with a fabric basket having a bottom, side walls, and end walls, one of said end walls extending diagonally outward from the top into engagement with an extended bottom, and a section of said bottom, adjacent said latter end wall, being provided with a board-like stiffener, a securing member carried by the top of said end wall, and fastening means carried by the bottom of said basket adjacent said end wall, whereby said board-like stiffener and adjacent portion of the bottom may be folded upward and secured by said securing member and fastening means to diminish the length and volume of said basket.

ABRAHAM G. FELDMAN.